United States Patent Office

2,893,824
Patented July 7, 1959

2,893,824
URANIUM RECOVERY PROCESS

Herbert H. Hyman, Chicago, Ill., and John L. Dreher, El Cerrito, Calif., assignors to the United States of America as represented by the United States Atomic Energy Commission No Drawing. Application April 19, 1950
Serial No. 156,938

15 Claims. (Cl. 23—14.5)

This invention relates to the treatment of metal waste solutions remaining after the recovery of plutonium from solutions of neutron-irradiated uranium. The present invention relates more particularly to the recovery of uranium substantially free of radioactivity due to the presence of the fission product values which are normally associated with uranium and plutonium in solutions of neutron-irradiated uranium and present in the untreated wastes after removal of plutonium.

Specifically, the present invention relates to the recovery of uranium values in substantially pure usable form from the waste solutions resulting from processing of neutron-irradiated uranium for recovery of plutonium.

Only a few percent of the $U^{235}$ isotope and a negligible amount of the $U^{238}$ isotope are consumed in a pile wherein uranium is employed as the fissionable source element in the formation of plutonium by the neutron bombardment of $U^{238}$. In the operation of a pile for formation of plutonium by neutron-irradiation of $U^{238}$, a large number of by-product elements are formed by fission of $U^{235}$. These by-product elements which are collectively designated by the term "fission products" are radioactive and further complicate the recovery of the desired elements, namely, plutonium and uranium from the mixture resulting from neutron bombardment of uranium.

Several processes have been devised for the recovery of plutonium from mixtures produced by the neutron-irradiation of uranium, one of the principal of these processes being the carrier precipitation of plutonium by a bismuth phosphate precipitation from aqueous acidic solutions of neutron-irradiated uranium containing the fission products normally associated therewith. After the carrier precipitation and separation of bismuth phosphate with associated plutonium from solutions of neutron-irradiated uranium, a uranium metal waste solution is obtained. Its composition is unfavorable with respect to uranium recovery for the solution is highly acidic and contains high concentrations of both phosphoric and sulfuric acids together with about 90 percent of the fission product elements which emit considerable $\beta$ and $\gamma$ radiation.

The acidic nature of these waste solutions is a complicating factor for the recovery of uranium values therefrom by solvent extraction, because, in addition to the corrosive effect exerted upon the vessels in which these wastes are contained during their transfer or storage or treatment by solvent extraction, the presence of sulfate and phosphate ions results in formation of uranium complexes thereby decreasing the extractibility of uranium by organic solvents. The presence of excess phosphate and sulfate also necessitates the use of large amounts of salting-out agent for a solvent extraction process.

It is therefore an object of the instant invention to provide a process for recovery of uranium values from those metal waste solutions obtained by processing solutions of neutron-irradiated uranium for recovery of plutonium therefrom and particularly those wastes obtained by the bismuth phosphate precipitation of plutonium from acidic aqueous solutions of neutron-irradiated uranium which contain the fission products normally associated therewith.

A further object of this invention is to provide a process whereby uranium values can be recovered in a reasonably concentrated form from the metal waste solutions having the aforementioned composition.

A further object of this invention is to provide a process whereby uranium can be recovered as a pure compound unassociated with other cations normally present in such metal waste solutions and in a form suitable for further processing for recovery of uranium as pure metal without the necessity for provision of shielding for personnel during such further processing.

A further object of this invention is to provide a process for the treatment of the aforesaid waste solutions so as to produce solutions of such composition that the radiation therefrom is at a level safe for discard and/or storage.

It is a further object of this invention to provide a process whereby such decontamination of these wastes will also concentrate at least part of the fission activity in a form in which the fission products are readily available for later recovery and isolation with ease and convenience.

Other objects and advantages will be apparent upon further examination of this specification.

We have discovered that uranium values can be recovered in useful form from the acidic aqueous metal waste solutions resulting from the bismuth phosphate carrier precipitation of plutonium from solutions of neutron-irradiated uranium. Such waste solutions usually contain phosphoric acid, sulfuric acid, and uranium as a uranyl salt, together with salts of the fission products normally associated with neutron-irradiated uranium. In brief, the process involves the partial neutralization, followed by complete alkalization of the waste solution, adsorption treatment of the alkaline solution with a silica gel, acid precipitation of uranium from the solution resulting from the adsorption treatment, dissolution of the precipitate in acid, and recovery of the uranium from the acidic solution by solvent extraction accomplished by contacting the acidic solution with a substantially water-immiscible organic solvent for the uranium values. Generally, the process of the invention comprises the partial neutralization of the above-described waste solution with sodium hydroxide, followed by a complete neutralization of any remaining acid and ultimate conversion of the solution to a pH 11 by mixing therewith sufficient sodium carbonate to solubilize all uranium including any uranium values precipitated during the initial partial neutralization with sodium hydroxide. The resultant carbonate-complexed waste is contacted with a silica gel adsorbent, preferably of the titanated silica gel type, and the adsorbent separated from the aqueous medium. The aqueous solution is then mixed with an organic carboxylic acid selected from the lower aliphatic acids. Sufficient organic acid is used to bring the pH of the aqueous medium to a value between 4 and 5, whereby the uranium values contained therein are concentrated by precipitation from said acidified aqueous phase. The uranium-containing precipitate is then separated from the aqueous medium and dissolved in nitric acid. The resultant nitric acid solution is preferably provided with a salting-out agent. The uranium values as uranyl nitrate are then extracted from the nitric acid solution by contact with a substantially water-immiscible organic solvent. Upon separation of the solvent phase from the aqueous phase, the uranium values can be recovered from the organic solvent phase by any suitable expedient, for example, by extraction with water.

Upon separation of plutonium from solutions containing neutron-irradiated uranium dissolved therein, the resultant metal waste solutions usually contain uranium values as uranyl nitrate hexahydrate to the extent of about a 20% concentration, together with 90% of the fission activity, and high concentrations of phosphoric acid, nitric acid and sulfuric acid, these acids having been added during the various processing steps employed for recovery of plutonium from neutron-irradiated uranium by the carrier-precipitation with bismuth phosphate. The fission products contained in the mother liquor and precipitate washes from the bismuth phosphate precipitate containing plutonium are present only in very small quantities, but the accompanying radiation is so intense that these waste solutions would eventually boil if stored.

The metal waste solution herein described is subjected to an initial partial neutralization with sodium hydroxide and the remaining acidity is subsequently neutralized with sodium carbonate. In the initial partial neutralization with sodium hydroxide, caustic is preferably added in the form of a 50% aqueous solution in sufficient amount to afford up to 90% of the theoretical requirement for complete neutralization of the acidic solution to a pH of 7. Sufficient sodium hydroxide is added preferably to effect a pH within a range of about 4 to 5. Considerable latitude is permitted in regard to the extent of partial neutralization by sodium hydroxide. Excess NaOH is avoided to prevent the formation of precipitates which are very difficult to dissolve by the sodium carbonate treatment. Toward the end of the initial partial neutralization by slow addition of sodium hydroxide a very bulky precipitate of uranium is formed at a pH of 2 to 3. It is preferred to add the caustic rapidly as any precipitate formed thereby is less gelatinous and dissolves more readily and with less foaming upon subsequent addition of sodium carbonate than is the case with the product precipitated by the slow addition of NaOH. Sodium hydroxide is employed for the initial partial neutralization to prevent foaming and because it is more soluble in water than sodium carbonate so that its use as a concentrated aqueous solution results in a minimum volume of carbonate-complexed solution. Compared with the sole use of sodium carbonate for neutralization and complexing, the use of sodium hydroxide followed by sodium carbonate addition reduced the volume of final solution by about 5 to 12%. The partial neutralization with sodium hydroxide under essentially adiabatic conditions would produce a maximum temperature rise of 40° C. in the treated solution. Although this rise would not be excessive, cooling during partial neutralization is preferred.

After the initial partial neutralization with sodium hydroxide, the solution is neutralized with sodium carbonate and sufficient sodium carbonate is added to effect a pH of about 11 in the over-all mixture, thereby solublizing any uranium precipitated during the initial neutralization. The sodium carbonate is preferably used in the form of a 30% aqueous solution for mixture with the partially neutralized metal waste solution. The partially neutralized waste is preferably added to the 30% sodium carbonate solution in order to minimize foaming and to immediately form a soluble carbonate complex of uranium.

Subsequent to the initial neutralization with sodium hydroxide there is no further temperature change upon addition of carbonate. At room temperature, the carbonate solutions have remained stable for as long as three months. If the carbonate solution is stored for a long period, the radioactivity will cause a temperature rise to as high as 75° C. and a precipitate containing 50 to 75% of the uranium will form as a result of the destruction of the carbonate complex. The precipitate can be dissolved by cooling and treatment with sodium carbonate solution; the resultant solution is added to the solution from which the precipitate had formed. For this reason it is preferred that the carbonate-complexed solution be used without storage periods of any substantial duration. An illustrative carbonate-complexed solution has an approximate composition of 10.5% uranyl nitrate hexahydrate, 9.2% sodium carbonate, 0.93 sodium nitrate, 3.1% sodium sulfate, 4.3% sodium phosphate, 0.3% sodium nitrite, 71.6% water and, of course, the fission products.

The carbonate-complexed solution is then treated with a silica gel adsorbent preferably of the titanated silica gel type. Optimum results are obtained by contacting the titanated silica gel with the carbonate-complexed solution in the presence of calcium ions.

The amount of decontamination obtained upon treatment with the silica adsorbent is improved by the presence of titanium dioxide; the decontamination increases with increasing content of titanium dioxide in the absorbent. The preferred content of titanium dioxide in the absorbent is at least 30% while optimum results are obtained by the use of a silica gel composition wherein the adsorbent gel is 58% titanium dioxide and 42% silicon dioxide. Usually at least about one gram of adsorbent per gram of uranium contained in the solution treated therewith is employed. Where a titanated silica gel alone was employed, the gamma decontamination factor obtained thereby was 11.6, while in the presence of divalent calcium ions, added in the form of a solution to provide at least 0.01 molar concentration of calcium, the gamma decontamination factor obtained is substantially increased. For example, when 0.03M calcium was provided, a gamma decontamination factor of 19.5 was obtained. Many factors, other than the presence of calcium, affect to some extent the efficiency of decontamination. They are the contact period between the silica gel and the solution treated and the ratio of the amount of silica gel employed to weight of uranium values.

After contact with the aqueous alkaline medium, the adsorbent is then separated from the treated aqueous solution containing uranium values dissolved therein and these values are concentrated by precipitation from the aqueous solution with an organic carboxylic acid belonging to the lower alphatic group. Acetic and formic acids are illustrative of suitable acids for such precipitation and sufficient acid is used to bring the pH of the solution to approximately 4. Acetic acid is the preferred precipitating agent for the uranium values. The precipitate formed is principally sodium uranyl acetate, $$NaUO_2(CH_3CO_2)_3$$

and it is easily separated. The separated precipitate is dissolved in a relatively small volume of nitric acid, preferably concentrated nitric acid, to provide a uranyl nitrate solution from which uranium values are solvent extracted.

Precipitation of uranium values directly from carbonate-complexed waste solutions by treatment with lower aliphatic carboxylic acids resulted in a gamma decontamination factor of less than 2; however, precipitation from solutions of carbonate-complexed uranium after treatment with a titanated silica gel absorbent resulted in a decontamination factor from 5 to 6 for the organic acid precipitation step alone, and the over-all resultant decontamination factor attained by the combination of the absorption step with the subsequent organic acid precipitation of uranium was consistently greater than 100. With extension of the digestion time for the simultaneous treatment of the carbonate-complexed solution with the silica gel absorbent in the presence of calcium ions and the subsequent precipitation of uranium from the resultant aqueous medium with the organic acid, an over-all decontamination factor exceeding 250 is obtained. The substantial decontamination attained by the adsorption step and the subsequent organic acid precipitation of uranium from the aqueous medium affects to a substantial degree the decontamination factor obtained during the organic solvent extraction of the uranium values from the nitric acid solution by contact with a water-immiscible organic solvent. Moreover, the precipitation of uranium values with an organic acid, such as acetic acid, helps to insure almost complete separation from sulfate and some separation from phosphate prior to obtaining a nitric acid solution of uranyl nitrate.

The solution for solvent extraction of uranium is prepared by dissolving the precipitated uranium values in nitric acid, suitably concentrated nitric acid (about 16 N). The resultant acid solution of uranyl nitrate preferably can also be provided with a water-soluble salting-out agent, such as an inorganic nitrate, which improves the distribution coefficient for uranium values between organic solvent and aqueous phases. The concentration of salting-out agent employed for best results depends largely upon the concentrations of sulfate and phosphate remaining in the aqueous nitric acid solution. Examples of suitable inorganic nitrate salting-out agents are ferric nitrate and aluminum nitrate. Aluminum nitrate is the most efficient of all salting-out agents and shows the least tendency to dissolve in the organic solvent phase. The nitric acid solution in which the precipitated uranium values have been dissolved is then preferably provided with the salting-out agent. An example of the final solution is one containing about 2 N nitric acid, a concentration of salting-out agent between 2 and 6 N, and between 15 to 20% uranyl nitrate hexahydrate.

The aqueous acid solution containing uranyl nitrate with or without the salting-out agent dissolved therein is contacted with an organic solvent, for example, in a batch extractor or in a continuous countercurrent column thereby extracting the uranyl nitrate into the organic solvent phase and leaving most of the $\beta$- and $\gamma$-emitting fission product impurities in the aqueous phase.

Examples of types of organic solvents suitable for the solvent extraction of uranyl values from nitric acid solution are: ketones, ethers, glycol ethers, and polyethers, which are substantially immiscible with water and aqueous solutions. If the solvent is a solid at room temperature the extraction is carried out at a temperature above its melting point.

The preferred organic solvent for uranium is a polyether, namely, the dibutyl ether of diethylene glycol, which permits the use of a minimum volume of solvent under equilibrium conditions resulting in better decontamination than is possible with ordinary ethers or ketones having equal power for recovery of uranium values. Examples of specific solvents suitable for use in this process are:

Diethyl ether
Diisopropyl ether
Butoxyethoxyethane (ethyl butyl "Cellosolve")
Diethyl ether of ethylene glycol (diethyl "Cellosolve")
Dibutyl ether of tetraethylene glycol
Eethyl acetate
n-Propyl acetate
Butoxyethoxyethyl acetate (butyl "Carbitol" acetate)
Acetophenone
Mesityl oxide
Cyclohexanone
Tert-amyl alcohol
2-ethyl-1-hexanol
Tributyl phosphate
Trioctyl phosphate
Dioctyl hydrogen phosphate
Octadecyl dihydrogen phosphate
Nitromethane
Ethyl sulfide
n-Propyl sulfide Of course, mixtures of the foregoing solvents can be used in carrying out the instant process.

The volume ratio of liquid organic solvent to the acidic aqueous solution can be varied widely and the optimum ratio is dependent upon the particular solvent employed. Suitable ratios are between 10 to 1 and 1 to 10, while the preferred volume ratio for aqueous solution to solvent is usually 2:1. The organic solvent is employed as either the dispersed phase or the continuous phase. When the preferred solvent, i.e. the dibutyl ether of diethylene glycol, was contacted with the acidic aqueous uranyl nitrate solution in a continuous countercurrent column, the extraction was 10 to 20% more efficient using the organic solvent as the dispersed phase. Uranyl nitrate is stripped from the organic solvent using water as the stripping agent. From the water extract the uranium values can be precipitated and recovered, usually as the diuranate. Alternately the aqueous extract phase can be used for a further organic solvent extraction re-extraction cycle after addition of nitric acid and preferably also the addition of the salting-out agent in appropriate concentrations to the aqueous extract phase containing the uranium values. This extraction re-extraction cycle produces further purification of the uranium.

The following example will illustrate the process of the present invention.

*Example*

Ten ml. of the metal waste solution from the bismuth phosphate precipitation of plutonium from uranyl nitrate solution obtained from neutron-irradiated uranium and having a composition equivalent to 20% uranyl nitrate hexahydrate, 0.6 M $H_3PO_4$, and 1 N $H_2SO_4$ is partially neutralized with a 50% solution of sodium hydroxide until the solution pH reaches about 4. To this treated solution is added a 30% aqueous solution of sodium carbonate sufficient to provide a pH in the vicinity of 11 after dilution with water to a total volume of 50 ml.

The resultant carbonate-complexed alkaline solution is agitated for ninety minutes in contact with 1 gram of a titanated silica gel adsorbent containing 58% titanium dioxide and 42% silicon dioxide. The adsorbent is removed from the aqueous medium by centrifugation. The separated aqueous medium is slowly added to 6 ml. of glacial acetic acid. The pH of the resultant solution is then about 4 and the resultant precipitate, which is primarily sodium uranyl acetate, is digested for thirty minutes and thereafter separated from the aqueous medium by centrifugation.

The precipitate is dissolved in 5 ml. of concentrated nitric acid resulting in a total volume of 10 ml. The solution was saturated with $Al(NO_3)_3 \cdot 9H_2O$. The final volume of the solution is about 20 ml. The solution is contacted with about two 10-ml. portions of methyl isobutyl ketone (hexone) thereby transferring uranium as uranyl nitrate from the aqueous to the organic solvent phase. The solvent phase containing the extracted uranium values is contacted with distilled water. The cycle of extraction followed by re-extraction into distilled water was repeated twice. The over-all gamma decontamination factor obtained by the foregoing entire process is of the order of $1 \times 10^4$ with recovery of over 90% uranium.

To test the efficiency of the process shown in the foregoing example, a solvent extraction process was carried out wherein the step of treating with adsorbent was omitted. The carbonate-complexed solution was acidified to precipitate a uranium compound which was dissolved in nitric acid. The salting-out agent was added to the resultant acidic solution. Results therefrom showed that the radiation level prior to the solvent extraction operation was more than 50-fold higher than the radiation encountered at the corresponding treatment step in the process of this invention. Moreover, that process which omitted the adsorbent treatment required for maximum decontamination an increase in the number of solvent extraction cycles, larger portions of solvent, and a greater quantity of aluminum nitrate as salting-out agent. In addition, an increase in the number of solvent extraction cycles failed to produce an over-all gamma decontamination factor equivalent to that obtained by the combination of steps shown in the process of the present invention. A similar failure to equal the gamma decontamination of the instant process was the carrying out of a direct solvent extraction of the metal waste solution after addition of aluminum nitrate using a larger solvent to aqueous solution ratio followed by re-extraction and then two cycles of extraction and re-extraction.

The efficiency of the process of the instant invention is indicated by the fact that the over-all uranium loss does not exceed a few percent as uranium losses in extraction cycles are very low and the losses of uranium encountered in the adsorption and precipitation steps are even less than those encountered in the solvent extraction.

The foregoing material, which is primarily descriptive, comprises the preferred embodiments for the instant invention. The scope of the instant invention is to be limited only by the scope of the claims appended hereto, which claims are intended to cover all features of novelty herein disclosed taken singly or in combination.

What is claimed is:

1. The process of recovering uranium values from an acidic aqueous solution containing phosphoric acid, sulfuric acid, a uranyl salt and salts of fission products, said solution resulting from a bismuth phosphate carrier-precipitation of plutonium from a solution of neutron-irradiated uranium, which comprises partially neutralizing said acidic solution with sodium hydroxide, adding to said partially neutralized solution sufficient sodium carbonate to effect a pH of about 11, contacting the resultant solution containing carbonate-complexed uranium values with a titanated silica gel adsorbent, separating said adsorbent from an aqueous medium, acidifying said aqueous medium to a pH between 4 and 5 with a lower aliphatic acid to form a precipitate containing uranium values, separating said precipitate and an aqueous medium, dissolving said precipitate in nitric acid to provide a uranyl nitrate solution, contacting said solution with a substantially water-immiscible organic solvent, and separating an organic solvent extract phase containing uranium values and an aqueous phase.

2. The process of claim 1 wherein the titanated silica gel adsorbent contains at least 30% titanium dioxide.

3. The process of claim 2 wherein the titanated silica gel adsorbent contains 52% $TiO_2$ and 48% $SiO_2$.

4. The process of recovering uranium values from an acidic aqueous solution containing phosphoric acid, sulfuric acid, a uranyl salt and salts of fission products, said solution resulting from a bismuth phosphate carrier-precipitation of plutonium from a solution of neutron-irradiated uranium, which comprises partially neutralizing said acidic solution with sodium hydroxide, adding to said partially neutralized solution sufficient sodium carbonate to effect a pH of about 11, contacting the resultant solution containing carbonate-complexed uranium values with a titanated silica gel adsorbent, separating said adsorbent from an aqueous medium, acidifying said aqueous medium to a pH between 4 and 5 with a lower aliphatic acid to form a precipitate containing uranium values, separating said precipitate and an aqueous medium, dissolving said precipitate in nitric acid to provide a uranyl nitrate solution, providing a salting-out agent in said uranyl nitrate solution, contacting said solution containing a salting-out agent with a substantially water-immiscible organic solvent, and separating an organic solvent extract phase containing uranium values and an aqueous phase.

5. The process of recovering uranium values from an acidic aqueous solution containing phosphoric acid, sulfuric acid, a uranyl salt and salts of fission products, said solution resulting from a bismuth phosphate carrier-precipitation of plutonium from a solution of neutron-irradiated uranium, which comprises partially neutralizing said acidic solution with sodium hydroxide, adding to said partially neutralized solution sufficient sodium carbonate to effect a pH of about 11, contacting the resultant solution containing carbonate-complexed uranium values with a titanated silica gel adsorbent while providing calcium ions in the aqueous carbonate-complexed solution, separating said adsorbent from an aqueous medium, acidifying said aqueous medium to a pH between 4 and 5 with a lower aliphatic acid to form a precipitate containing uranium values, separating said precipitate and an aqueous medium, dissolving said precipitate in nitric acid to provide a uranyl nitrate solution, providing a salting-out agent in said uranyl nitrate solution, contacting said solution containing a salting-out agent with a substantially water-immiscible organic solvent, and separating an organic solvent extract phase containing uranium values and an aqueous phase.

6. The process of recovering uranium values from an acidic aqueous solution containing phosphoric acid, sulfuric acid, a uranyl salt and salts of fission products, said solution resulting from a bismuth phosphate carrier-precipitation of plutonium from a solution of neutron-irradiated uranium, which comprises partially neutralizing said acidic solution with sodium hydroxide, adding to said partially neutralized solution sufficient sodium carbonate to effect a pH of about 11, contacting the resultant solution containing carbonate-complexed uranium values with a titanated silica gel adsorbent, separating said adsorbent from an aqueous medium, acidifying said aqueous medium to a pH between 4 and 5 with acetic acid to form a precipitate containing uranium values, separating said precipitate and an aqueous medium, dissolving said precipitate in nitric acid to provide a uranyl nitrate solution, providing a salting out agent in said uranyl nitrate solution, contacting said solution containing a salting-out agent with a substantially water-immiscible organic solvent, and separating an organic solvent extract phase containing uranium values and an aqueous phase.

7. The process of claim 6 wherein the organic solvent is a ketone.

8. The process of claim 7 wherein the ketone is methyl isobutyl ketone.

9. The process of claim 6 wherein the organic solvent is an ether.

10. The process of claim 9 wherein the ether is diethyl ether.

11. The process of claim 6 wherein the organic solvent is a polyether.

12. The process of claim 11 wherein the polyether is the dibutyl ether of diethylene glycol.

13. The process of claim 6 wherein the salting-out agent is aluminum nitrate.

14. The process of recovering uranium values from an acidic aqueous solution containing phosphoric acid, sulfuric acid, a uranyl salt and salts of fission products, said solution resulting from a bismuth phosphate carrier-precipitation of plutonium from a solution of neutron-irradiated uranium, which comprises partially neutralizing said acidic solution with sodium hydroxide, adding to said partially neutralized solution sufficient sodium carbonate to effect a pH of about 11, contacting the resultant solution containing carbonate-complexed uranium values with a titanated silica gel adsorbent, separating said adsorbent from an aqueous medium, acidifying said aqueous medium to a pH between 4 and 5 with acetic acid to form a precipitate containing uranium values, separating said precipitate and an aqueous medium, dissolving said precipitate in nitric acid to provide a uranyl nitrate solution, contacting said solution with a substantially water-immiscible organic solvent, and separating an organic solvent extract phase containing uranium values and an aqueous phase.

15. The process of recovering uranium values from an aqueous solution containing phosphoric acid, sulfuric acid, a uranyl salt and salts of fission products, said solution resulting from a bismuth phosphate carrier-precipitation of plutonium from a solution of neutron-irradiated uranium, which comprises partially neutralizing said acidic solution with sufficient sodium hydroxide to provide a pH of about 4, mixing a 30% solution of sodium carbonate with the resultant partially neutralized solution to effect a pH of about 11, contacting the resultant solution containing carbonate-complexed uranium values with a titanated silica gel adsorbent containing 52% $TiO_2$ and 48% $SiO_2$, separating said adsorbent from an aqueous medium, mixing acetic acid with said aqueous medium to effect a pH between 4 and 5 and to form a precipitate containing uranium values, separating said precipitate and an aqueous medium, dissolving said precipitate in nitric acid to provide a uranyl nitrate solution, providing aluminum nitrate in said uranyl nitrate solution, contacting said solution containing aluminum nitrate with the dibutyl ether of diethylene glycol, and separating an organic solvent extract phase containing uranium values and an aqueous phase.

No references cited.